United States Patent [19]

Tsuruta et al.

[11] Patent Number: 5,043,400
[45] Date of Patent: Aug. 27, 1991

[54] PRODUCTION OF COMPOSITE RESINS

[75] Inventors: Akeharu Tsuruta; Hisato Kawaguchi; Tomohiro Ishikawa; Yozo Kondo, all of Mie, Japan

[73] Assignee: Tosoh Corporation, Yamaguchi, Japan

[21] Appl. No.: 644,864

[22] Filed: Jan. 23, 1991

Related U.S. Application Data

[63] Continuation of Ser. No. 284,278, Dec. 14, 1988, abandoned.

[30] Foreign Application Priority Data

Dec. 16, 1987 [JP] Japan ............................ 62-316115

[51] Int. Cl.$^5$ ............................ C08J 3/00; C08L 67/00
[52] U.S. Cl. .................................... 525/437; 525/132; 525/146; 525/151; 525/176; 525/177; 525/394; 525/395; 525/397; 525/399; 525/400; 525/424; 525/425; 525/432; 525/439; 525/444; 525/440; 525/448; 524/35
[58] Field of Search ............... 525/132, 146, 151, 176, 525/177, 394, 395, 397, 399, 400, 424, 425, 432, 437, 439, 440, 444, 448; 524/35

[56] References Cited

U.S. PATENT DOCUMENTS

| | | | |
|---|---|---|---|
| 4,386,174 | 3/1983 | Cogswell | 524/27 |
| 4,433,083 | 2/1984 | Cogswell | 524/27 |
| 4,438,236 | 3/1984 | Cogswell | 525/165 |
| 4,614,784 | 9/1986 | Kozakiewicz | 527/313 |
| 4,728,698 | 3/1988 | Isayev | 525/439 |

FOREIGN PATENT DOCUMENTS

| | | |
|---|---|---|
| 169947 | 5/1986 | European Pat. Off. |
| 115357 | 9/1981 | Japan |
| 26656 | 2/1986 | Japan |
| 116666 | 5/1987 | Japan |

OTHER PUBLICATIONS

Patent Abstracts of Japan, vol. 9, No. 309 (C-318)[2032], 5th Dec. 1985.
Polymer Engineering & Science 1987, vol. 27, No. 6, pp. 411-423.
Polymer Engineering & Science 1987, vol. 27, No. 9, pp. 653-662.
Polymer Composites 1987, vol. 27, No. 3, pp. 158-175.

Primary Examiner—Melvyn I. Marquis
Assistant Examiner—David Buttner
Attorney, Agent, or Firm—Sughrue, Mion, Zinn, Macpeak & Seas

[57] ABSTRACT

A method for producing articles of composite resin, wherein a liquid crystal polymer material in powder form is mixed with a second, melt-processable polymer material; the resulting mixture is kneaded at a temperature at which the second polymer material will melt but at which no deformation of the liquid crystal polymer will be caused so as to prepare a blend comprising the liquid crystal polymer powder uniformly dispersed in the matrix of the second polymer; and the blend is then subjected to a molding or shaping process at a temperature within the range at which the liquid crystal polymer is capable of forming liquid crystals.

7 Claims, No Drawings

PRODUCTION OF COMPOSITE RESINS

This is a continuation of application Ser. No. 07/284,278 filed Dec. 14, 1988, now abandoned.

This invention relates to a method of blending polymers capable of forming anisotropic melts thereof (such a polymer will be referred to as "liquid crystal polymer" hereinafter) and a second polymeric material. In particular, the invention relates to such a method in which fibers of a liquid crystal polymer are formed in a certain regular arrangement in a matrix of a melt-processable resin upon molding or shaping whereby the matrix can be used to produce reinforced moldings, fibers, filaments, films, sheets and the like.

Because of the rigid rod-like structure of their molecules, liquid crystal polymers generally exhibit relatively low viscosities in their molten state in comparison with ordinary thermoplastic resins and, when sheared, tend to orientate in the shearing direction to a high degree. Various types of liquid crystal polymers possessing high fluidity and orientation properties have been developed.

It has been proposed to blend liquid crystal polymers with other melt-processable polymers so as to provide polymeric compositions which are improved in processability and mechanical properties by making use of the attributes of the special fluidity and orientation characteristics of liquid crystal polymers (see for example Japanese Patent Application Public Disclosure (KOKAI) Nos. 56-115357; 57-25354; 57-40550; 57-40551; 57-40555 and 57-51739).

In all the above proposals, however, the liquid crystal polymers and the melt-processable polymeric materials are blended by employing the conventional melt-blending technique. Although it has been found that the blended products (at least in some limited ranges of blending ratio) will provide articles formed therefrom with improved mechanical properties as compared with cases where the respective polymeric components are employed alone, it is not intended to improve the mechanical properties of final products by means of higher order-structural control exercised in the blending of the liquid crystal polymer and the melt-processable polymer.

Recently it has also been proposed to reinforce a matrix resin by orientation of a liquid crystal polymer material in acicular or fiber form in a matrix resin. This is known as the "in situ composite" technique and is described, for example, in Japanese patent application Public Disclosure (KOKAI) No. 62-116666; Polymer Engineering and Science 27 (1987), 410; Polymer Composite, 8 (1987), 158; and Polymer Engineering and Science 27 (1987), 653. This technique allows certain advantages to be achieved, such as the fact that the manufacturing process is simplified and that the manufacturing machine and other apparatus are worn by the filler to a reduced extent as compared with cases where the resins are reinforced by using conventional reinforcing materials such as glass fiber.

Again in the "in situ composite" technique, the liquid crystal polymer and the matrix resin are subjected to melt-kneading. Therefore, since the dispersibility of the liquid crystal polymer in the matrix resin is largely governed by the compatibility and relative proportions of the two polymeric components and by the extent of kneading, it is frequently observed that the shape or size of the fibers formed of the liquid crystal polymer in the matrix displays an extended distribution range. In other words, it is difficult to obtain a desired narrow range of shape or size of the liquid crystal fibers by employing the "in situ composite" technique. This wide distribution range of the shape or size of the liquid crystal polymer fibers in the matrix is not desirable in terms of achieving the intended improvement in the mechanical properties of the matrix resin in an efficient manner. If the liquid crystal polymer is dispersed in a very finely divided form in the matrix during the kneading step of the "in situ composite" technique, the surface energy of the fine particles is unduly increased so that the shearing deformation of the finely divided particles that is necessary for forming the fibers is prevented. On the other hand, if the liquid crystal polymer is dispersed in a coarse particulate form, the fibers will be formed with a large diameter or a sheetlike structure. Hence the fibers will have a decreased L/D ratio (or aspect ratio), which is not desirable in terms of improving the mechanical properties of final products.

In view of the difficulties encountered in the conventional methods, one of the objects of the present invention is to provide a method for efficiently improving the mechanical properties of resinous moldings or shapings by uniformly dispersing in a matrix resin a liquid crystal polymer in a powder form within a certain particle size range so as to permit the dispersed liquid crystal polymer powder to form regularly arranged fibers in the matrix resin when subjected to a molding or shaping process.

In order to solve the problems encountered in the conventional methods, we have studied how best to introduce the liquid crystal polymer into the matrix resin material. As a result of our studies, it has been found that moldings or shapings having liquid crystal polymer fibers within a narrow diameter range dispersed in a matrix resin can be obtained by introducing a liquid crystal polymer in powder form within a certain particle size range into a melt-processable matrix; kneading the resulting mixture at a temperature at which the matrix resin will melt but at which the particles of the liquid crystal polymer will not be deformed so as to prepare a blend comprising particles of the liquid crystal polymer dispersed uniformly in the matrix resin; and molding or shaping the blend at a temperature within the range at which the liquid crystal polymer is capable of forming liquid crystals.

Accordingly the present method is characterized in that a liquid crystal polymer in the form of a powder within a given particle size range is uniformly dispersed in a matrix resin and the mixture is subjected to molding or shaping so as to produce shaped or molded articles, fibers films or the like containing uniformly dispersed liquid crystal polymer fibers within a certain diameter range and having improved fabricability and mechanical properties.

The liquid crystal polymer materials which may be used in the present invention are thermoplastic resins exhibiting liquid crystal properties in the molten state and may be a polymer having a nematric or smectic or cholesteric structure.

Examples of such liquid crystal polymers include aromatic polyesters as described, for example, in GB Patent No. 1,507,207; U.S. Pat. Nos. 3,778,410, 4,067,852, 4,083,829, 4,130,545 and 4,161,470; aromatic polyazomethines as described in U.S. Pat. No. 4,048,148; aromatic polyester amides as described in European Patent No. 79-391,276; and other aromatic polyester-polycabonates, aromatic polyimide-polyesters, aromatic polyisocyanates and the like.

Although the melt-processable polymer used in the present invention may exhibit any liquid crystal properties in its own nature, the primary object of the present invention is to improve the processability and mechanical properties of compositions based upon the conventional melt-processable polymers. Thus, examples of the melt-processable polymers which may be used in the invention include polyolefins, acrylic polymers, polystyrene, polyphenylene oxide, polyamides, polyphenylene sulfide, polyesters, polysulfone, polyether sulfone, polyketones, polyether ketones, polyfluorolefins, polyoxymethylene, thermoplastic cellulosic polymers, microbially produced polymers (such as polyhydroxybutyrate) and blends thereof. These thermoplastic materials may be used in combination with one or more thermosetting materials, provided that the resulting compositions are melt-processable. Examples of suitable thermosetting materials include injection-moldable polyurethanes, silicone rubbers, phenolic resins and amino resins.

The liquid crystal polymer powder employed in the invention is dispersed in a matrix of the melt-processable resin in the molten state. Although the processing temperature of the matrix resin depends on the nature of the resin, generally the processing temperature should be about 5° to 150° C. lower than the liquid crystal forming temperature of the liquid crystal polymer to be used in combination with the matrix resin. If the matrix resin is processed at a temperature equal to or higher than the liquid crystal forming temperature of the liquid crystal polymer, uniform dispersion of the liquid crystal polymer particles may not be achieved in the matrix resin, because particles of the liquid crystal polymer are subject to deformation, particle size reduction, coalescence or the like under the influence of shearing force where particles of the liquid crystal polymer are dispersed in the molten matrix resin. However, for example in the case where the melt viscosity of the liquid crystal polymer is higher than that of the matrix resin to a degree sufficient to substantially protect the particles of the liquid crystal polymer from deformation when they are kneaded together, the kneading step may be carried out at a temperature higher than the liquid crystal forming temperature.

The appropriate particle size of the liquid crystal polymer powder used in the invention ranges from about 10 to about 1,000 $\mu$m and preferably from about 50 to about 250 $\mu$m. Where the particle size is less than about 10 $\mu$m, shearing deformation of the particles of the liquid crystal polymer may not or little be caused in the matrix resin and the liquid crystal polymer is only able to form fibers that are unevenly distributed in the matrix. On the other hand, if the particle size is greater than about 1,000 $\mu$m, the liquid crystal polymer will be rearranged in the matrix as fibers with an unduly large diameter or with a sheetlike structure. This means that the fibers of the liquid crystal polymer formed in the matrix show a low L/D ration (or aspect ratio) which will not be effective in improving the mechanical properties of the products prepared from the blend.

The proportion of liquid crystal polymer to be used in the present invention is from about 1 to about 80%, preferably from 5 to 70%, by weight on the basis of the total weight of the matrix resin and the liquid crystal polymer. If the liquid crystal polymer is employed in an amount of less than 1% by weight on the same basis, the mechanical properties of the final products would not be improved to any appreciable extent. If the liquid crystal polymer is employed in a proportion of greater than 80% by weight on the same basis, the fibers of liquid crystal formed in the matrix would tend to coalescence into sheetlike structure resulting in a low reinforcement effect.

The kneaded mixture comprising particles of the liquid crystal polymer dispersed uniformly in the matrix is then subjected to molding or shaping in a range of temperature within which the liquid crystal polymer is capable of forming liquid crystals. In regard to ensuring that the liquid crystal polymer is effectively formed into fibers in the matrix resin, the difference between the melt viscosity of the matrix resin, and that of the liquid crystal polymer is an important parameter. Under the shearing stress that is applied during molding or shaping, if the apparent ratio of the viscosity of matrix resin to the viscosity of liquid crystal polymer is in the range of from about 0.5 to about 100, particles of the liquid crystal polymer may be deformed by the shearing stress and will be efficiently formed into fibers in a desirable state. If the apparent viscosity ratio is less than 0.5, the formation of fibers from the liquid crystal polymer in the matrix resin would not proceed efficiently.

The liquid crystal forming temperature of liquid crystal polymer at which the molding or shaping step is effected according to the present invention may be easily determined by conventional means such as DSC, X-ray diffraction, polarized microscope or the like. Although the liquid crystal polymer will form an isotropic molten phase above the upper limit of the liquid crystal forming temperature, a temperature above the upper limit may be used in the molding or shaping step provided that the liquid crystal polymer is able to form liquid crystals after taking into account the shearing force used in that step, as well as being efficiently fiberized in the matrix.

Generally, the liquid crystal polymers tend to display an emphasized or dramatic "shear thinning" effect as compared with ordinary thermoplastic resins. For this reason the liquid crystal polymers will show a significantly reduced melt viscosity and will be efficiently fiberized when a shearing rate of about $10^2$ sec$^{-1}$ or more is employed in the molding or shaping step.

In an embodiment of the present method for producing articles of composite resins, the liquid crystal polymer and the matrix resin are first kneaded, for example, in a conventional kneader and/or extruder, the kneaded mixture is pelletized, and the pellets are subjected to molding or shaping, for example, by an injection molding technique. In an alternative embodiment, the extrudate from the kneading step may be directly fed to the subsequent step, for example, a step of film-forming by the T-die method, or one of spinning by the melt spinning method.

A matrix resin into which a liquid crystal polymer has been introduced in accordance with the present invention exhibits a significantly reduced melt viscosity in comparison with the viscosity of a matrix resin devoid of such a liquid crystal polymer. Thus the moldability of the matrix resin is improved.

In addition, since the kneading of the liquid crystal polymer and the matrix resin is effected at a temperature below the liquid crystal forming temperature of the liquid crystal polymer, if a liquid crystal polymer powder within a predetermined range particle size is employed, it is possible to uniformly disperse this liquid crystal polymer with the particle size in the matrix. Consequently, it is possible to form fibers of the liquid crystal polymer with a uniform diameter that are uniformly dispersed in the matrix by molding or shaping the blend at a temperature at which the liquid crystal polymer is capable of forming liquid crystals.

The uniform dispersion of the liquid crystal polymer in the matrix resin achieved by the present invention permits the liquid crystal polymer to be used in an increased proportion with increased benefits such as increased mechanical properties as compared with the case where both materials are blended by the conventional melt-blending technique.

In this way, according to the present invention, composite moldings, films, sheets, fibers and the like are provided which offer improved fabricability and mechanical properties by using a simple but well-controlled method.

EXAMPLE

The invention will be described in more detail with reference to the following Examples and Comparative Examples.

EXAMPLE 1

A polysulfone resin ("UDEL" P-1700; manufactured by Amoco Performance Products Industry; 90 parts by weight) and a wholly aromatic polyester (liquid crystal polymer) in powder form having a particle size range of from 150 to 250 μm (10 parts by weight) were mixed together. The mixture was kneaded in a "Laboplastomill" single screw extruder (manufactured by Toyo Seiki Mfg. Co.) and extruded through a die. The resulting continuous extrudate was taken off by a "Melt-strength" take-off machine so as to form a line of monofilament.

The liquid crystal polymer used consisted of 60 mole % of 4-oxybenzoyl units, 15 mole % of terephthaloyl units, 5 mole % of isophthaloyl units and 20 mole % of 1,4-dioxydiphenylene units. The liquid crystal polymer exhibited a melting point of 336° C. when measured by the DSC method. The melt viscosity was determined in a flow tester (manufactured by Shimazu Mfg. Co.) with a die having a capillary length of 2 mm and a diameter of 0.5 mm and was found to be 1,300 poises at a temperature of 340° C. and at a shear rate of $10^3$ sec$^{-1}$.

The used polysulfone resin had a melt viscosity of 5,600 poises when measured under the same conditions as above.

The kneading conditions employed in the extruder were a cylinder temperature of 300° C., a rotation speed of 5 rpm and a die temperature (or take-off temperature) of 340° C. The extruder die had a capillary length of 10 mm and a diameter of 2.1 mm. The extrudate was taken off at various speeds of 10, 50 and 100 m/min.

The mechanical properties of the product filaments were determined using an "Autograph" testing apparatus (manufactured by Shimazu Mfg. Co.) with a sample having an aspect ratio of greater than 100 and a strain rate of $10^{-3}$ sec$^{-1}$.

EXAMPLE 2

The general procedure described in Example 1 was repeated except that a take-off temperature of 370° C. was employed instead of one of 340° C.

The ratio of the melt viscosity of the polysulfone (PSF) at 370° C. to that of the liquid crystal polymer (LCP) at 370° C. was 20 (at a shear rate of $1 \times 10^4$ sec$^{-1}$).

EXAMPLE 3

The general procedure described in Example 1 was repeated except that the particle size of the liquid crystal polymer powder ranged from 500 to 1000 μm.

EXAMPLE 4

The general procedure described in Example 1 was repeated except that the polysulfone resin was used in a proportion of 70 parts by weight and the liquid crystal polymer was used in a proportion of 30 parts.

EXAMPLE 5

The general procedure described in Example 1 was repeated except that the polysulfone resin was used in a proportion of 50 parts by weight and the liquid crystal polymer was used in a proportion of 50 parts.

The mechanical properties of the monofilament products obtained in Examples 1-5 are shown in Table I.

COMPARATIVE EXAMPLE 1

The general procedure described in Example 1 was repeated except that the profile of the cylinder temperature used in the kneader/extruder unit was set in such a fashion that the temperatures ins the first, second and third zones of the cylinder were 340° C., 320° C. and 300° C., respectively, and that the liquid crystal polymer was fed in a pellet form.

COMPARATIVE EXAMPLE 2

The procedure of Comparative Example 1 was repeated except that 70 parts by weight of the polysulfone resin was combined with 30 parts by weight of pellets of the liquid crystal polymer in the kneader,

COMPARATIVE EXAMPLE 3

The procedure of comparative Example 1 was repeated except that 50 parts by weight of the polysulfone resin was combined with 50 parts by weight of pellets of the liquid crystal polymer in the kneader.

COMPARATIVE EXAMPLE 4

The procedure of Comparative Example 1 was repeated except that the liquid crystal polymer was omitted and the polysulfone resin was used alone.

COMPARATIVE EXAMPLE 5

The procedure described in Example 1 was repeated except that the take-off temperature was set at 300° C.

The ratio of the melt viscosity of the polysulfone (PSF) resin at 300° C. to the melt viscosity of the liquid crystal polymer (LCP) at 300° C. was 0.2 (at a shear rate of $1 \times 10^4$ sec$^{-1}$).

The mechanical properties of the monofilament products obtained in Comparative Examples 1-5 are shown in Table II.

COMPARATIVE EXAMPLE 6

The general procedure described in Example 1 was repeated except that the polysulfone resin was used in a proportion of 10 parts by weight and the liquid crystal polymer was used in a proportion of 90 parts.

The resulting filament was heterogeneous and brittle and was not suitable to be subjected to the test for measuring mechanical properties.

COMPARATIVE EXAMPLE 7

The general procedure of Example 1 was repeated except that the particle size of the liquid crystal polymer was 2000 μm.

A significantly increased torque was required in the kneading operation. The resulting monofilament was heterogeneous.

TABLE I

| Examples | Composition by wt. PSF/LCP | LCP Particle Size (μm) | Take-off Temp. (°C.) | PSF/LCP Viscosity ratio | Take-off Speed (m/min) | Tensile Strength (kg/cm²) | Tensile Modulus (kg/cm²) | Elongation (%) |
|---|---|---|---|---|---|---|---|---|
| 1 | 90/10 | 150-250 | 340 | 3 | 10 | 700 | 35,000 | 3.5 |
|   |       |         |     |   | 50 | 740 | 34,000 | 3.8 |
| 2 | 90/10 | 150-250 | 370 | 20 | 10 | 670 | 40,000 | 2.1 |
|   |       |         |     |   | 50 | 740 | 39,000 | 3.8 |
| 3 | 90/10 | 500-1000 | 340 | 3 | 10 | 650 | 34,000 | 3.2 |
|   |       |         |     |   | 50 | 700 | 32,000 | 3.3 |
| 4 | 70/30 | 150-250 | 340 | 3 | 10 | 760 | 69,000 | 1.1 |
|   |       |         |     |   | 50 | 800 | 62,000 | 1.8 |
| 5 | 50/50 | 150-250 | 340 | 3 | 10 | 590 | 78,000 | 0.7 |
|   |       |         |     |   | 50 | 630 | 92,000 | 0.8 |

Notes to Table I
1 PSF stands for polysulfone.
2 LCP stands for liquid crystal polymer.
3 PSF/LCP viscosity ratio was determined at a shear rate of $1 \times 10^4 \text{sec}^{-1}$.
4 Elongation is the value at yield point.

TABLE II

| Comp. Examples | Composition by wt. PSF/LCP | LCP Particle Size (μm) | Take-off Temp. (°C.) | PSF/LCP Viscosity ratio | Take-off Speed (m/min) | Tensile Strength (kg/cm²) | Tensile Modulus (kg/cm²) | Elongation (%) |
|---|---|---|---|---|---|---|---|---|
| 1 | 90/10 | (Pellet) | 340 | 3 | 10 | 560 | 28,000 | 2.2 |
|   |       |          |     |   | 50 | 470 | 25,000 | 1.7 |
| 2 | 70/30 | (Pellet) | 340 | 3 | 10 | 690 | 55,000 | 1.1 |
|   |       |          |     |   | 50 | 630 | 37,000 | 2.3 |
| 3 | 50/50 | (Pellet) | 340 | 3 | 10 | 220 | 23,000 | 0.9 |
|   |       |          |     |   | 50 | 270 | 20,000 | 1.2 |
| 4 | 100/0 | — | 340 | — | 10 | 660 | 22,000 | 6.0 |
|   |       |   |     |   | 50 | 650 | 22,000 | 6.2 |
| 5 | 90/10 | 150-250 | 300 | 0.2 | 10 | 470 | 23,000 | 3.0 |
|   |       |         |     |     | 50 | 490 | 24,000 | 2.8 |
| 6 | 10/90 | 150-250 | 340 | 3 | — | — | — | — |
| 7 | 90/10 | 2000 | 340 | 3 | — | — | — | — |

Notes to Table II
1 The pellets were spherical and about 3 mm in diameter.
2 The filament products of Comparative Examples 6 and 7 were heterogeneous and could not be tested for mechanical properties.

What is claimed is:

1. A method for producing articles of composite resins, wherein a liquid crystal polymer material in powder form is mixed with a second, melt-processable polymer material; the resulting mixture is kneaded at a temperature at which the second polymer material will melt but at which no deformation of the liquid crystal polymer will be caused so as to prepare a blend comprising the liquid crystal polymer powder uniformly dispersed in the matrix of the second polymer; and the blend is then subjected to a molding or shaping process at a temperature within the range at which the liquid crystal polymer is capable of forming liquid crystals;
    wherein the particle size of the liquid crystal polymer powder ranges from 50 to 250 μm,
    wherein the liquid crystal polymer material is present in a proportion of from 1 to 80% by weight of the total weight of the liquid crystal polymer and the matrix polymer, and
    wherein the ratio of the viscosity of the matrix polymer material measured at a temperature used in the molding or shaping step to the viscosity of the liquid crystal polymer measured at the same temperature is in the range of from about 0.5 to about 100.

2. A method as claimed in claim 1 wherein the liquid crystal polymer is nematic or smectic or cholesteric.

3. A method as claimed in claim 1 wherein the melt-processable polymer material is based on one or more thermo-plastic polymers.

4. A method as claimed in claim 1 wherein the matrix polymer material is processable at a temperature lower by 5°–150° C. than the liquid crystal forming temperature of the liquid crystal polymer.

5. A method as claimed in claim 1 wherein the liquid crystal polymer material is present in a proportion of 5 to 70%, by weight of the total weight of the liquid crystal polymer and the matrix polymer.

6. A method as claimed in claim 3 wherein the melt-processable polymer material is selected from the group consisting of polyolefins, acrylic polymers, polystyrene, polyphenylene oxide, polyamides, polyphenylene sulfide, polyesters, polysulfone, polyether sulfone, polyketones, polyether ketones, polyfluorolefins, polyoxymethylene, thermoplastic cellulosic polymers, microbially produced polymers and blends thereof.

7. A method as claimed in claim 2 wherein the liquid crystal polymer is selected from aromatic polyesters, aromatic polyazomethines, aromatic polyester amides, aromatic polyester-polycarbonate, aromatic polyimide-polyesters and aromatic polyisocyanates.

* * * * *